(12) United States Patent
Graham et al.

(10) Patent No.: US 8,186,745 B2
(45) Date of Patent: May 29, 2012

(54) DEVICE FOR REDUCING VEHICLE AERODYNAMIC RESISTANCE

(75) Inventors: Sean C Graham, Seattle, WA (US); Mike Graham, State College, PA (US); Coty T Hollifield, Seattle, WA (US)

(73) Assignee: Freight Wing Inc., Seattle, WA (US)

( * ) Notice: Subject to any disclaimer, the term of this patent is extended or adjusted under 35 U.S.C. 154(b) by 96 days.

(21) Appl. No.: 12/559,499

(22) Filed: Sep. 15, 2009

(65) Prior Publication Data

US 2011/0062749 A1    Mar. 17, 2011

(51) Int. Cl.
    B62D 35/02    (2006.01)
(52) U.S. Cl. .......... 296/180.1; 296/180.4; 180/903
(58) Field of Classification Search ........ 296/180.1, 296/180.02, 180.03, 180.4, 181.2, 901.01, 296/180.2, 180.3; 180/903; 105/1.1, 1.3
    See application file for complete search history.

(56) References Cited

U.S. PATENT DOCUMENTS

| | | | |
|---|---|---|---|
| 4,262,953 A | 4/1981 | McErlane | |
| 4,386,801 A | 6/1983 | Chapman et al. | |
| 4,486,046 A | 12/1984 | Whitney et al. | |
| 4,611,847 A | 9/1986 | Sullivan | |
| 4,640,541 A | 2/1987 | FitzGerald et al. | |
| 4,810,021 A | 3/1989 | Burst | |
| D317,425 S | 6/1991 | Vysotsky et al. | |
| 5,277,444 A | 1/1994 | Stropkay | |
| 5,280,990 A | 1/1994 | Rinard | |
| 5,375,882 A | 12/1994 | Koch, III | |
| 5,609,384 A | 3/1997 | Loewen | |
| 5,921,617 A * | 7/1999 | Loewen et al. | 296/180.4 |
| 6,193,431 B1 * | 2/2001 | Rutledge | 403/268 |
| 6,644,720 B2 * | 11/2003 | Long et al. | 296/180.4 |
| 6,685,256 B1 | 2/2004 | Shermer | |
| 6,742,616 B2 | 6/2004 | Leban | |
| 6,929,313 B2 * | 8/2005 | Fries et al. | 296/193.05 |
| 6,974,178 B2 | 12/2005 | Ortega et al. | |
| 7,093,889 B2 * | 8/2006 | Graham | 296/180.4 |
| 7,497,502 B2 | 3/2009 | Wood | |
| 7,578,541 B2 | 8/2009 | Layfield et al. | |
| 7,887,120 B2 * | 2/2011 | Boivin et al. | 296/180.4 |
| 7,942,466 B2 * | 5/2011 | Reiman et al. | 296/180.4 |
| 7,950,721 B1 * | 5/2011 | Peterson | 296/180.4 |
| 2004/0256884 A1 * | 12/2004 | Schwartz | 296/180.4 |
| 2005/0161976 A1 * | 7/2005 | Ortega et al. | 296/180.4 |
| 2007/0120397 A1 * | 5/2007 | Layfield et al. | 296/180.4 |
| 2007/0176466 A1 * | 8/2007 | Dolan et al. | 296/203.03 |
| 2010/0187856 A1 * | 7/2010 | Boivin et al. | 296/180.4 |
| 2010/0231000 A1 * | 9/2010 | Andrus et al. | 296/180.4 |
| 2010/0264691 A1 * | 10/2010 | Giromini et al. | 296/180.4 |

OTHER PUBLICATIONS

Energotest 2008 Test Report, Oct. 2008, CR-441-14 (24 pages).*

* cited by examiner

*Primary Examiner* — Dennis Pedder
*Assistant Examiner* — Jason S Daniels

(57) ABSTRACT

A device for reducing vehicle aerodynamic resistance for vehicles having a generally rectangular body disposed above rear wheels, comprising a plurality of flexible opposing flat sheets and a plurality flexible load bearing struts attached to the bottom of the rectangular body, that bend to resist damage when struck by the ground, and guide airflow around the rear wheels of the vehicle to reduce its aerodynamic resistance when moving.

12 Claims, 5 Drawing Sheets

DEVICE FOR REDUCING VEHICLE AERODYNAMIC RESISTANCE

TECHNICAL FIELD

The invention relates to a device for reducing the aerodynamic resistance of a moving, rectangular shaped vehicle and more particularly to a pair of opposing airfoils that are mounted underneath the vehicle adjacent its sides.

BACKGROUND ART

It is well known that streamlining the undercarriage of a long vehicle such as a trailer truck or straight van truck will reduce the aerodynamic resistance of a moving vehicle and thus save fuel. However, streamlining the undercarriage of a long vehicle such as a semi-trailer is impractical because integrated enclosures are heavy, costly, easily damaged, interfere with standardized structural design, and prevent access to parts and equipment underneath the vehicle. Consequently, removable attachments have been designed to streamline the undercarriage of long vehicles. However, past designs for removable attachments have not achieved significant utilization because they are typically easily damaged, difficult to repair, difficult to mount, incompatible with different trailer and truck geometries, become filled with snow and ice in winter driving conditions, do not provide the maximum drag decrease possible, and are too costly to generate a significant return on investment through associated fuel use reductions.

The device described herein seeks to improve on the prior art and past designs by using new aerodynamic geometry to provide improved drag reduction and by incorporating the capability for both vertical and lateral movement of the flexible flat panel airfoils in order to provide greater durability and impact resistance.

Prototypes of the device reduced a semi-trailer's fuel consumption by 7.45% in fuel economy tests conducted by a respected third party using the Society of Automotive Engineer's (SAE) J1321 type II standardized procedure. Past designs for comparable aerodynamic attachments have demonstrated a 4% to 6% reduction in fuel consumption in similar tests. The improved aerodynamic performance of the device described herein when compared to past designs is primarily due to the flexible design which allows for lower effective aerodynamic coverage to the ground. Wind tunnel tests on undercarriage aerodynamic attachments have demonstrated that a maximum drag reduction is achieved by enclosing the entire undercarriage from the bottom of the vehicle to the ground. This maximum drag reduction is due to preventing air flow from going underneath the attachment and impacting the wheels and axle components. However, enclosing the entire undercarriage with an aerodynamic attachment is impractical because uneven road surfaces such as rail-road crossings and inclined loading docks will impact the attachment when the vehicle moves over them causing damage to the device. Consequently, past designs typically demonstrate a ground clearance from level ground to the bottom of the attachment of 12 to 18 inches so that they can pass over irregular ground surfaces without being damaged. The device described herein achieves a much lower ground clearance than past designs of approximately 8 inches and therefore provides enhanced drag reduction while also improving operational effectiveness though the ability to absorb ground impacts. The low ground clearance of the device is made possible by incorporating a combination of flexible flat panels, articulating mounting brackets and flexible struts that enable the panels to easily deflect and curve. Because the device is constructed of durable and flexible materials and has numerous degrees of freedom of movement, it can bend to absorb impacts from the ground or absorb side impacts such as frozen snow banks, and can return to its original position. Prototypes have demonstrated the ability to flex up to 25 inches off the ground and return to their original position undamaged. Due to this flexibility, the device can pass over larger obstacles than past designs without damage. Many past designs have incorporated a flexible bottom panel section, but these designs do not provide the needed rigidity for lower panel aerodynamic resistance or add cost, weight and complexity to the design when still only providing clearance of up to 12 to 18 inches. This amount of clearance is not preferable as there are many operation situations where up to 20 inches of clearance is required for a typical semi-trailer. Unlike past designs which are mounted straight along the longitudinal edge of the vehicle, the device described herein also features an angled mounting position. This optimal aerodynamic positioning improves drag reduction on the wheel and axle components by diverting air flow around the outside of the vehicle preventing it from entering the space behind the attachment. The angled position also integrates with common vehicle features such as landing struts. Unlike past designs, the optimal aerodynamic positioning of this device also insures the panel does not interfere with operating the landing strut deployment hand crank mechanism. The angled position also removes the forward portion of the attachment from the sides of the vehicle, providing increased clearance to potential side impacts, further allowing unobstructed access to common vehicle features such as turn signal lamps. The device described herein is easily packaged and shipped, can be easily mounted on the undercarriage of trailers and trucks of different geometries and construction, resists damage, and can be easily repaired with replacement parts. The device described herein does not enclose the undercarriage of the trailer or create irregular surfaces, thereby preventing snow and ice build-up and allowing access to parts underneath the trailer or truck.

Despite a compelling need in the transportation industry to reduce fuel cost, prior art and past designs have been ineffective in providing a cost effective solution for most applications. The device described herein uses a minimal amount of material resulting in reduced weight and production costs. As every pound of weight of the device corresponds to less paid cargo capacity of the transportation vehicle, the device described herein weighs an approximate 175 pounds. The device described herein achieves many improved benefits due to its utilization of common, extruded flat panel plastic material. Extruded plastic panels offers ideal flex characteristics and considerable cost savings during manufacturing including both the production of the material as well as the ease of automated computer numerical controlled (CNC) fabrication of panel shapes and fastening holes. Other previous designs are limited by more expensive and complex designs using thermoplastic material that needs vacuum forming or injection molding. Other designs and prior art necessitate the use of multiple materials in the panel assembly or materials such as metal sheet, metal composite panels, or fiberglass composite panels that do not have the proper flex characteristics to effectively resist damage. The device described herein combines a new application of extruded plastic flat panel sheets with a new design method that enables the device to achieve efficiencies previously not possible.

DISCLOSURE OF THE INVENTION

In general, a device for reducing vehicle aerodynamic resistance disposed on the bottom of a vehicle having a generally rectangular body disposed above rear wheels, when made in accordance with this invention, comprises a single or plurality of opposing flexible flat sheets attached to the underside of the rectangular body, each having a top edge disposed adjacent the bottom of the rectangular body and a bottom edge disposed to a predetermined height above the ground such that the opposing sheets may either be parallel to the sides of the rectangular body or angled inward such that the leading edge of the opposing sheets are closer together towards the front of the rectangular body and disposed in an angled orientation to the centerline of the vehicle. A plurality of attachment brackets having a hinged degree of freedom whose axis is in line with the top edge of the opposed sheets connect the upper edge of the opposed sheets to the underside of the rectangular body. A plurality of load bearing flexible struts of a predetermined size and flexibility attached to the bottom of the rectangular body a predetermined distance from the inside of the opposed sheets and attached to the opposed sheets at a predetermined distance from the bottom edge of the opposed sheets, having a hinged degree of freedom at both the underside of the rectangular body and at the opposed sheet attachment, which can absorb impact in the event of a lateral or vertical impact, whereby the flexible load bearing struts and flexible opposed sheets bend toward the rectangular body in an elastic manner and allow the opposed sheets to return undamaged to a planar geometry upon ending the application of the external force used to create the bending. The presence of the opposed sheets direct the airflow around the rear wheels and axle components to reduce the aerodynamic resistance of the vehicle when moving.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

BEST MODE FOR CARRYING OUT THE INVENTION

Figure 1:
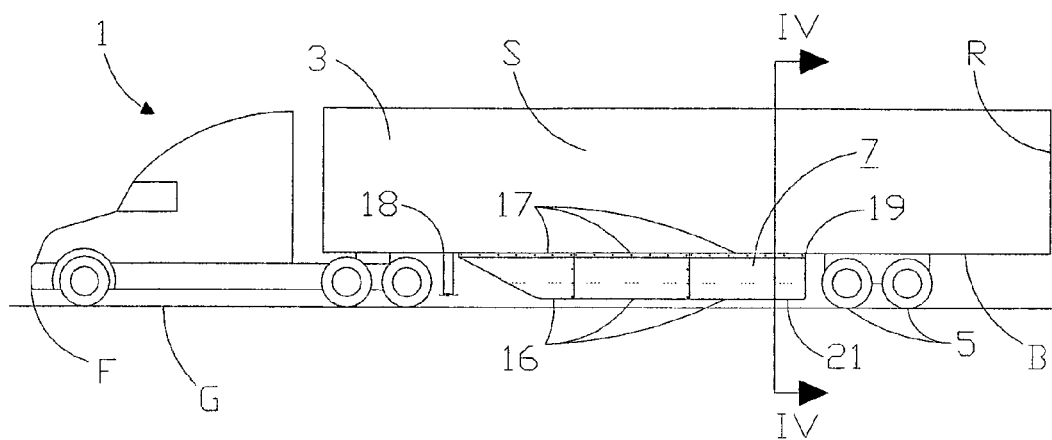
FIG. 1 is a side elevational and bottom view of a vehicle with a rectangular body with an airfoil devise made in accordance with this invention disposed thereon.
Figure 2:
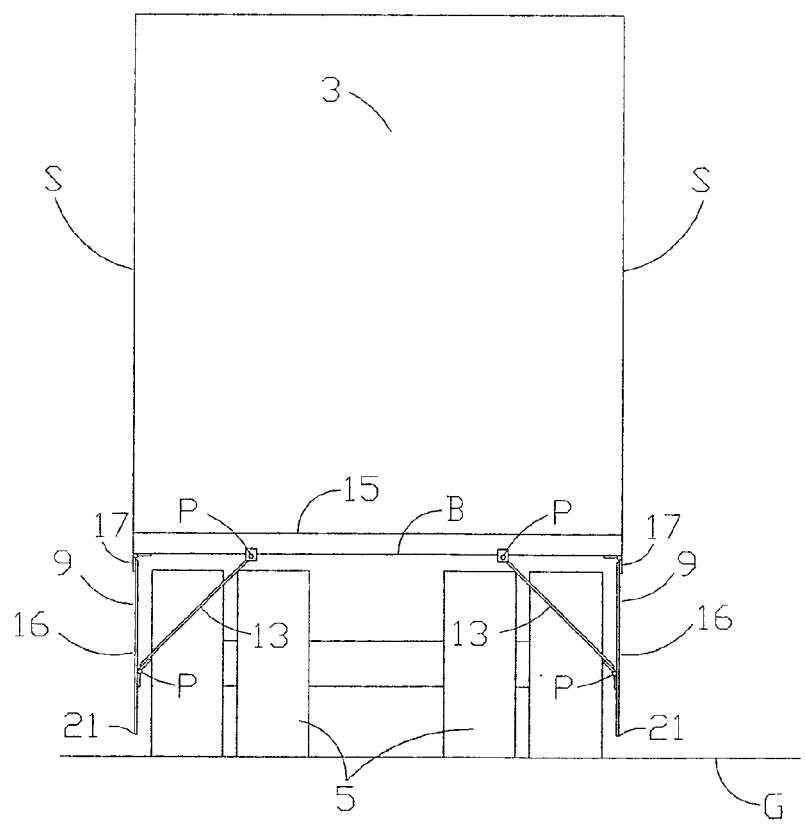
FIG. 2 is a sectional view taken on line IV-IV of FIG. 1.
Figure 3:
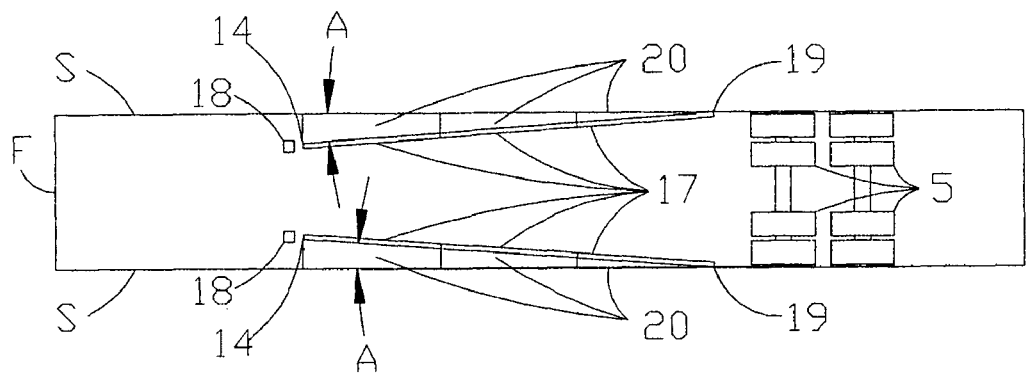
FIG. 3 is a bottom elevational view of a vehicle with a rectangular body with an airfoil devise made in accordance with this invention disposed thereon.

Referring now to the drawings in detail and in particular to FIGS. 1, 2 and 3, there is shown a vehicle 1 such as a trailer truck, having a generally rectangular body 3 having a front F, rear R, bottom B and opposed sides S mounted above rear wheels 5 and a device 7 for reducing the aerodynamic resistance of the vehicle 1 when it moves.

The device 7 comprises a pair of opposed airfoils 9 disposed beneath the rectangular body 3. Each opposing airfoil comprises opposed load bearing members 17 of a predetermined size, which are attached continuously and linearly to the bottom B of the rectangular body 3, and define the position of the opposed airfoils 9 on the vehicle 1. As shown in the bottom view of FIG. 3, the opposed load bearing members 17 form opposed acute mounting angles A with the sides S of the rectangular body 3. The acute mounting angles A are disposed at rearward mounting points 19 adjacent the sides S of the rectangular body at a predetermined distance in front of the rear wheels 5. The acute mounting angles A also position the opposed load bearing members 17 such that they extend from the rearward mounting points 19 to forward mounting points 14 disposed at a predetermined distance from the sides S of the rectangular body. The forward mounting points 14 are preferably adjacent to the vehicle support struts 18, but it is understood that the opposed acute mounting angles A can be any value under 20 degrees including 0 to accommodate different vehicle configurations. Opposed flat sheets 16 are attached to the load bearing members 17 and extend vertically toward the ground to bottom edge 21. The opposed flat sheets 16 are preferably made of a flexible plastic material, but other material could be utilized. The lower edge 21 of the opposing flat sheets 16 is at a predetermined height above the ground surface G, which is preferably approximately 8 inches but could higher or as low as 4 inches. Each opposed flat sheet 16 is preferably attached to one load bearing member 17 of approximately the same length, which is preferably approximately 90 inches. While only three opposed flat sheets 16 are shown, it is understood that any number of opposed flat sheets 16 could be used to accommodate rectangular bodies 3 of different lengths. Each opposing airfoil 9 further comprises opposed flexible load bearing struts 13 of a predetermined length and flexibility, which are attached at pivot points P to the bottom B of the rectangular body 3 at a predetermined distance from the opposed load bearing members 17, and to the opposed flat sheets 16 at a predetermined height above their lower edge 21. The load bearing struts 13 are designed to carry loads from different directions and support the opposed flat sheets 16 to prevent wind induced movement during normal vehicle operation, but can also flex to absorb both side and vertical impacts and return to their original position to prevent damage to the device 7. In the preferred embodiment of the design shown, opposing flat cover sheets 20 are attached to the bottom B of the rectangular body, as illustrated in the bottom view of FIG. 3. Each opposing flat cover sheet 20 has an outer edge 22 adjacent the sides S of the rectangular body 3, and an inner edge 23 adjacent the load bearing members 17. The opposing flat cover sheets 20 are designed to cover irregular surfaces on the bottom of the rectangular body such as cross members 15, which when left exposed create wind drag, to further reduce the aerodynamic resistance of the vehicle 1 when moving.

Figure 4:
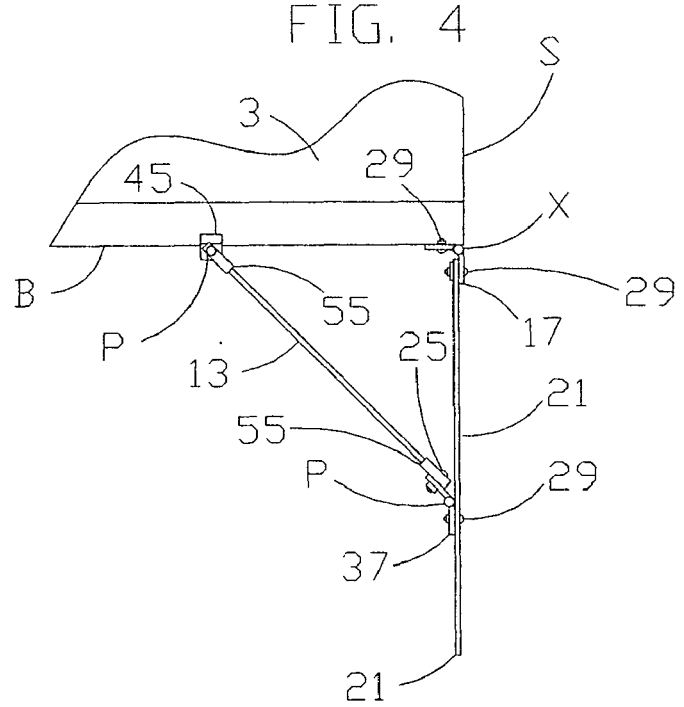
FIG. 4 is a partial sectional view taken on line IV-IV of FIG. 1.

FIG. 4 shows a detailed view of opposed load bearing members 17 attached to bottom B of the rectangular body 3, with opposed flat sheets 16, and opposed flexible load bearing struts 13. The opposed load bearing members 17 are preferably continuous hinges with an axis point X adjacent the bottom B of the rectangular body, although non hinged members such as an L shaped channel could also be used. The opposed load bearing members 17 are shown attached to cross members 15 by removable fastening means 29. Opposed flat sheets 16 are attached to the opposed load bearing members 17 at a top edge 24 by removable fastening means 29. Flexible load bearing struts 13 are preferably attached to cross members 15 by opposing clamping tabs 45 at a pivot point P, which also serves as removable fastening means. The flexible load bearing struts 13 are shown fabricated from rods of fiberglass reinforced plastic, with metal sleeves 47 attached at both ends to reinforce connection points. The flexible load bearing struts 13 are also attached to the opposed flat sheets 16, preferably by strut hinges 37 which have a pivot point P. The flexible load bearing struts 13 can be attached to the strut hinges 37 by easily removable fastening means 25, such that when removed, the opposed flat sheet 16 can rotate about axis point X to open and provide access to the bottom B of the rectangular body 3 and any vehicle components mounted thereupon. The opposed load bearing members 17, opposed flat sheets 16, strut hinges 37, and flexible load bearing struts 13 are all attached by removable fastening means 29 so that they can all be easily replaced if worn or damaged.

Figure 5:
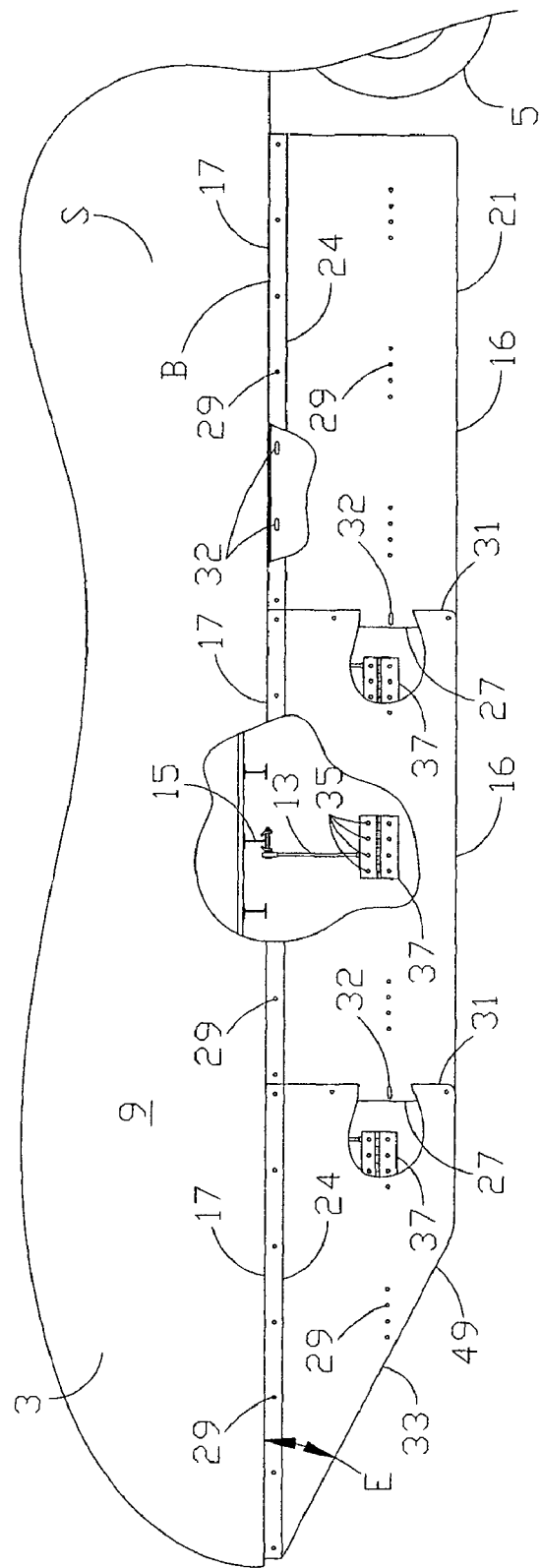
FIG. 5 is a partial side elevational view of a vehicle showing typical installation of the airfoil devise.

FIG. 5 shows a typical installation of an opposed airfoil 9 on a rectangular body 3. Opposed flat sheets 16 each have a top edge 24 attached to the opposed load bearing members 17, a forward edge that can attach to adjacent opposed flat sheets 27, a rearward edge 31 that can attach to adjacent opposed flat sheets 16, and a lower edge 21 disposed at a predetermined height above the ground surface G. Opposed flat sheets 16 are attached to load bearing members 17 by removable fastening means 29, so that opposed flat sheets 16 can be easily installed and replaced if worn or damaged. Horizontally elongated fastener holes 32 are adjacent the top edge 24 of the opposed flat sheets 16 relative to the removable fastening means 29, so that the thermal expansion and contraction of the plastic material does not damage or warp the opposed flat sheets 16. The rearward edge 31 of the opposed flat sheets 16 overlap the forward edge 27 of adjacent opposed flat sheets 16 and are attached by removable fastening means 29. Horizontally elongated fastener holes 32 are adjacent the forward edge 27 of the opposed flat sheets 16 relative to the removable fastening means 29, so that the thermal expansion and contraction of the plastic material does not damage or warp the opposed flat sheets 16. The removable fastening means 29 connecting adjacent opposed flat sheets 16 are preferably shoulder bolts, so that the overlapping sheets are not clamped together tightly and the shoulder bolts can move freely in the elongated fastener holes 32, so that the thermal expansion and contraction of the plastic material does not damage or warp the opposed flat sheets. In the preferred embodiment of the design shown, the most forward opposed flat sheet 33 has a forward edge 27 forming an acute angle E with respect to the bottom of the rectangular body B and the opposed flat sheets 16 disposed behind the most forward opposed flat sheet 33 are generally rectangular in shape, although it is understood that the most forward opposed flat sheet 33 could also be generally rectangular in shape. Flexible load bearing struts 13 are removably attached to vehicle cross members 15 and to strut hinges 37, which are attached to the inside surface of the opposed flat sheets 16 at a predetermined distance above the bottom edge 21 of the opposed flat sheets 16 of approximately 12 inches. Preferably, the flexible load bearing struts 13 are spaced approximately every 2 to 3 feet along the vehicles side S, but could be spaced differently. The strut hinges 37 preferably feature multiple connection points 35 across their length to assist in aligning the flexible load bearing struts 13 with suitable cross members 15 on the bottom of the rectangular body B during installation on the vehicle.

Figure 6:
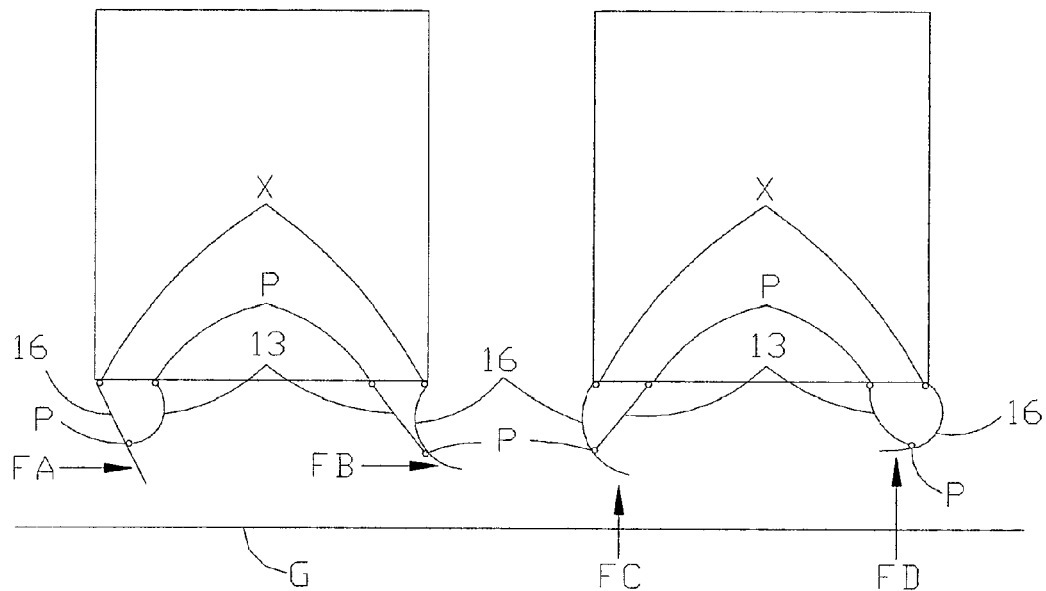
FIG. 6 is a rear sectional view of a vehicle showing modes of deflection from impact forces of varying direction.

FIG. 6 shows two examples of the opposed airfoils 9 attached to a rectangular body 3 to illustrate how opposed flat sheets 16 and flexible load bearing struts 13 bend and deflect from impact forces of varying direction and magnitude to resist damage to the device 7. Flexible load bearing struts 13 are attached to the bottom B of the rectangular body 3 and the opposed flat sheets 16 by pivot points P that enable the flexible load bearing struts 13 to rotate about the pivot points P. The opposed flat sheets 16 are attached to the bottom B of the rectangular body 3 by load bearing members 17 with axis points X that enable the opposed flat sheets 16 to rotate about the axis points X. The pivot points P and axis points X are important to the operation of the device 7 because they enable the flexible load bearing struts 13 and opposed flat sheets 16 to deflect and bend freely into an arc of consistent radius to absorb impact forces of varying direction and then return to their original position. Impact force FA represents a horizontal side impact directed from the outside of the rectangular body 3. Force FA results in the opposed flat sheets 16 rotating inward about the axis point X, while the flexible load bearing struts 13 bend into an arc of consistent radius and rotate about pivot points P, such that the stress on the flexible load bearing struts 13 is minimized. Impact force FB represents a horizontal side impact directed from underneath the rectangular body 3. Force FB results in the opposed flat sheets 16 rotating about the axis point X and pivot point P while bending into an arc of consistent radius, thereby minimizing the stress on the opposed flat sheets 16 and the opposed load bearing members 13. Impact force FC represents a small vertical impact directed from the ground G. Force FC results in the opposed flat sheets 16 rotating outward about the axis point X and pivot point P while bending into an arc of consistent radius, thereby minimizing the stress on the opposed flat sheets 16 and the opposed load bearing members 17. Impact force FD represents a large vertical impact directed from the ground G. Force FD results in both the opposed flat sheets 16 and flexible load bearing struts 13 bending into a arcs of consistent radius while rotating about the axis point X and pivot points P, thereby minimizing the stress on the opposed flat sheets 16, flexible load bearing struts 13, and the opposed load bearing members 17. It is understood that other impact forces and combinations of forces could be similarly deflected by the opposed airfoils 9. The linear mounting of opposed load bearing members 17 and consequently the opposed flat sheets 16 is fundamental to the ability of the device 7 to flex and bend freely across the entire length of the device as shown in FIG. 6, as non planer panels would not bend consistently and would resist bending. The ability to deflect vertical and side impacts as illustrated in FIG. 6 is important to the durability of the device 7, but also enables the predetermined height above the ground surface G of the lower edge 21 of the opposing flat sheets 16 to be minimized without resulting in damage to the device 7. Consequently maximum airflow is directed around the rear wheels 5, providing a maximized reduction of the aerodynamic resistance of the vehicle when moving.

Figure 7:
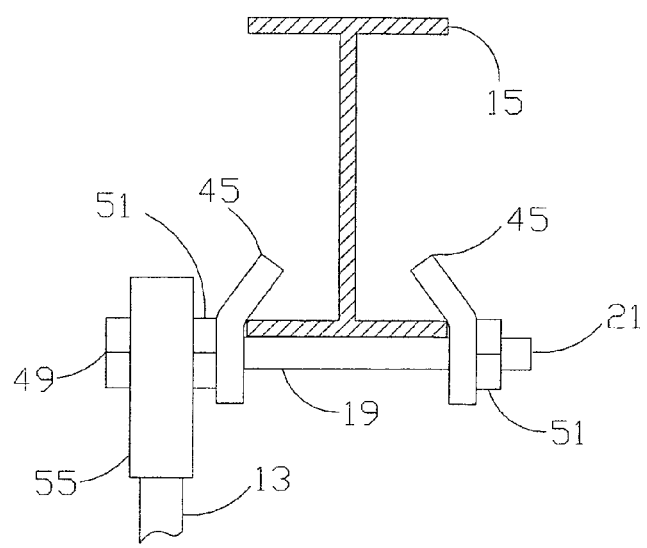
FIG. 7 is a partial side elevational view of a flexible load bearing strut and clamping means.

FIG. 7 shows in detail the preferred attachment of the flexible load bearing struts 13 to the bottom of the rectangular body 3 and more specifically a cross member 15 by clamping means. The clamping means comprising a pair of opposing clamping tabs 45, each having a bend 39 disposed above a fastener hole, so that a clamping bolt 49 can pass through the opposing clamp tabs 45 and a nut 51 can be tightened on the clamping bolt 49 to exert a force on the opposed clamping tabs 45 to attach them to the cross member 15. In the preferred embodiment shown, the clamping bolt 49 passes through the flexible load bearing strut 13 so that the strut is adjacent the head of the bolt 49 and the bolt 49 serves as a pivot point P for the flexible load bearing strut 13. A spacer nut 51 prevents the clamping force from impeding the free rotation of the flexible load bearing strut 13 about the pivot point P. The flexible load bearing strut 13 shown is fabricated from a rod of fiberglass reinforced plastic, with a metal sleeves 55 attached to reinforce the connection point.

Figure 8:
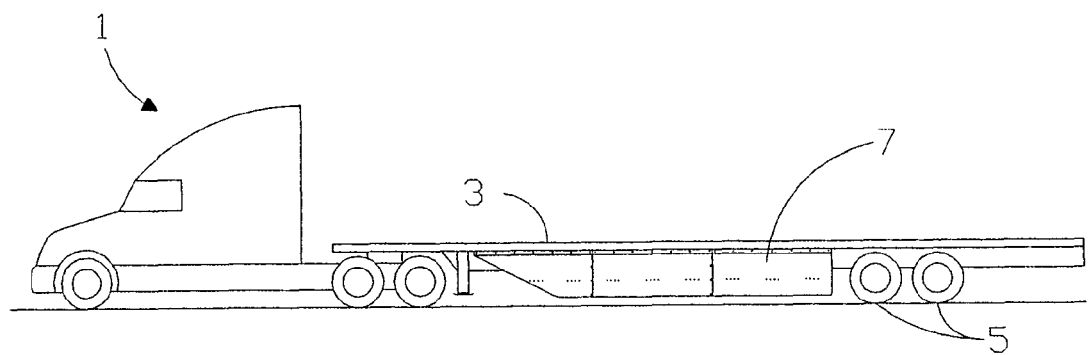
FIG. 8 is a side elevational view of a vehicle with a rectangular body of different geometry and an airfoil device made in accordance with this invention disposed thereon.

FIG. 8 shows a preferred embodiment of the device 7 attached to a vehicle 1 of different geometry having a rectangular body 3 with a lower overall height, representative of a flat bed detachable trailer. It is understood that the device 7 can be adapted to accommodate detachable trailers of other different geometries as well, including drop deck trailers and tanker trailers.

Figure 9:
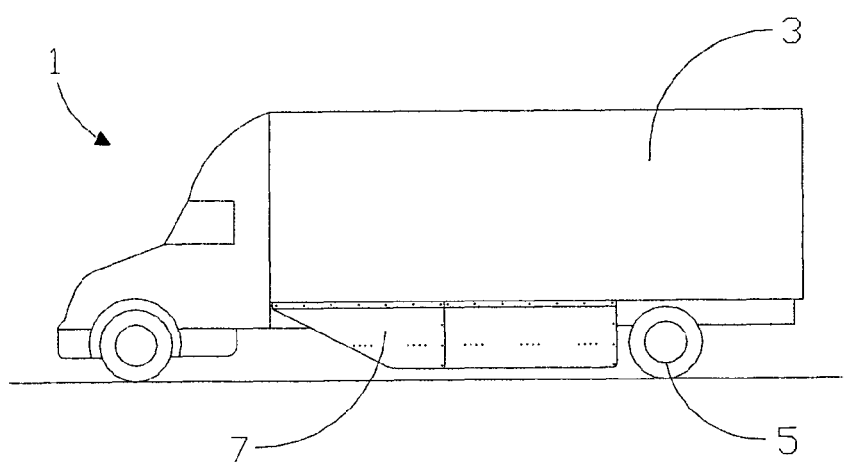
FIG. 9 is a side elevational view of a vehicle with a rectangular body of different geometry and an airfoil device made in accordance with this invention disposed thereon.

FIG. 9 shows a preferred embodiment of the device 7 attached to a vehicle 1 of different geometry having a rectangular body 3 that is not a detachable trailer, representative of a straight truck. It is understood that the device 7 can be adapted to accommodate straight trucks of other different geometries as well, including flat bed trucks and tanker trucks.

While the preferred embodiments described herein set forth the best mode to practice this invention presently contemplated by the inventor, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

INDUSTRIAL APPLICABILITY

An aerodynamic reducing device 7 for a vehicle 1 as set forth in this invention provides a device 7, which is economical to manufacture and to maintain, and is easily packaged, transported, and installed in the field on rectangular vehicles of varying geometry. It provides a pair of removable airfoil portions that will substantially reduce the aerodynamic resistance of the moving vehicle 1, thus reducing fuel consumption, fuel cost and air pollution.

The invention claimed is:

1. A device for reducing aerodynamic resistance of a vehicle, having a generally rectangular body with a front, a rear, a bottom, and sides disposed above rear wheels, which positions the rectangular body a predetermined position above a ground surface, the device comprising: a plurality of opposed load bearing members of a predetermined size, attached continuously and linearly to the bottom of the rectangular body to form opposed acute mounting angles of not more than 20 degrees with the sides of the rectangular body and rearward mounting points adjacent the sides of the rectangular body at a predetermined distance in front of the rear wheels; a plurality of opposed flat sheets disposed vertically with respect to the ground and made of flexible material, each having a top edge attached to the opposed load bearing members so that the opposed flat sheets are oriented continuously and linearly in the same vertical planes defined by the opposed acute mounting angles, a forward edge that can attach to adjacent opposed flat sheets, a rearward edge that can attach to adjacent opposed flat sheets, and a lower edge disposed at a predetermined height above the ground surface and below the bottom of the rectangular body; a plurality of opposed flexible load bearing struts of a predetermined length and flexibility, attached at pivot points to the bottom of the rectangular body at a predetermined distance from the opposed load bearing members and attached at pivot points to the opposed flat sheets at a predetermined height above the lower edge; whereby the flexible load bearing struts support the opposed flat sheets to prevent wind induced movement during normal vehicle operation, can bend freely by rotating at the pivot points into an arc of consistent radius to absorb side impacts and then return to their original position, while also enabling the flexible opposed flat sheets to bend freely by rotating at the pivot points connecting the load bearing struts to absorb vertical impacts by uneven ground surfaces and then return to their original position; so that the predetermined height above the ground surface of the lower edge of the opposing flat sheets can be minimized without resulting in damage to the device due to impacting uneven ground surfaces, so that maximum airflow is directed around the rear wheels reducing the aerodynamic resistance of the vehicle when moving.

2. A device as set forth in claim 1, wherein each opposed flat sheet is attached to one opposed load bearing member of approximately equivalent length and all of the opposed load bearing members are hinged, so that the attached opposed flat sheets can rotate about an axis point adjacent their top edge and the bottom of the rectangular body, and can bend in an ark of consistent radius across the horizontal length of the device if impacted by uneven ground surfaces.

3. A device as set forth in claim 1, wherein the length of the opposed flat sheets is consistent and approximately 90 inches and the quantity used can be varied to adjust the overall size of the device to accommodate vehicles with rectangular bodies of different lengths.

4. A device as set forth in claim 2, wherein each flexible load bearing struts is attached to the opposed flat sheets with one easily disconnected fastener, so that when the easily disconnected fasteners are disconnected the opposed flat sheets can freely rotate about the axis point of the hinged load bearing members and open to provide convenient access to the bottom of the rectangular body.

5. A device as set forth in claim 4, wherein each flexible load bearing struts is attached to the opposed flat sheets with one easily disconnected fastener and attached to the bottom of the rectangular body with one easily disconnected fasteners, so that worn or damaged load bearing struts can be easily replaced.

6. A device as set forth in claim 1, further comprising a plurality of opposing flat cover sheets attached to the bottom of the rectangular body, each having an outer edge adjacent the sides of the rectangular body, and an inner edge adjacent the load bearing members, and each being of approximately the same length as the load bearing members, so that irregular surfaces on the bottom of the rectangular body that when left exposed create wind drag are covered by the flat cover sheets to further reduce the aerodynamic resistance of the vehicle when moving.

7. A device as set forth in claim 1, wherein the opposed flexible load bearing struts are connected to cross members on the bottom of the vehicle by clamping means, comprising a pair of opposing clamping tabs, each having one bolt hole and a bend disposed above the bolt hole, so that one clamping bolt oriented horizontally and adjacent the bottom of the cross member can pass through both of the opposing clamping tabs to position the bends on the cross member, and a nut can be tightened on the clamping bolt to exert a horizontally oriented clamping force on the opposing clamping tabs.

8. A device as set forth in claim 7, wherein the clamping bolt is also the pivot point for the opposed flexible load bearing struts, and a spacer nut is fixed on the clamping bolt adjacent the flexible load bearing strut so that the clamping force does not prevent the rotation of the flexible load bearing strut on the clamping bolt.

9. A device as set forth in claim 1, wherein the vehicle has support struts attached to the bottom of the rectangular body at a predetermined distance from the sides of the rectangular body disposed near the front of the body, and the opposed acute mounting angles position the opposed load bearing members and the opposed flat sheets such that they extend in straight lines from the vertex of the opposed acute mounting angles located at rearward mounting points to forward mounting points that are disposed adjacent to the vehicle support struts.

10. A device as set forth in claim 1, wherein a plurality of strut hinges, each having a top leaf and a bottom leaf, are attached to the opposed flexible load bearing struts at the top leaf, and to the opposed flat sheets at the bottom leaf, so that the strut hinges form said pivot points.

11. A device as set forth in claim 10, wherein each strut hinge has multiple bolt holes across the length of the top leaf so that one bolt hole can be selected to attach the load bearing strut, in order to assist in aligning the flexible load bearing struts with suitable connection points on the bottom of the rectangular body during installation on the vehicle.

12. A device for reducing aerodynamic resistance of a vehicle, having a generally rectangular body with a front, a rear, a bottom, and sides disposed above rear wheels, which positions the rectangular body a predetermined position above a ground surface, the device comprising: a plurality of opposed load bearing members of a predetermined size, hinged with an axis adjacent the bottom of the rectangular body, attached continuously and linearly to the bottom of the rectangular body to form opposing acute mounting angles of not more than 20 degrees with the sides of the rectangular body and rearward mounting points adjacent the sides of the rectangular body at a predetermined distance in front of the rear wheels, the opposing acute mounting angles positioning the opposed load bearing members such that they extend from the rearward mounting points to forward mounting points adjacent vehicle support struts attached to the bottom of the rectangular body at a predetermined distance from the sides of the rectangular body; a plurality of opposed flat sheets disposed vertically with respect to the ground and made of flexible plastic material, each having a top edge attached to the opposed load bearing members by removable fastening means, a rearward edge that can overlap adjacent opposed flat sheets and attach thereto by removable fastening means, a forward edge that can attach to adjacent opposed flat sheets, and a lower edge disposed at a predetermined height above the ground surface of approximately 8 inches and below the bottom of the rectangular body; a plurality of opposed flexible load bearing struts of a predetermined length and flexibility, attached at pivot points to the bottom of the rectangular body by clamping means at a predetermined distance from the opposed load bearing members, and to the opposed flat sheets at a predetermined height above the lower edge by strut hinges with an easily disconnected fastener, so that when the easily disconnected fastener is disconnected the opposed flat sheets can freely rotate about the axis point of the hinged load bearing members and open to provide convenient access to the bottom of the rectangular body; whereby the flexible load bearing struts support the opposed flat sheets to prevent wind induced movement during normal vehicle operation, can bend freely by rotating at the pivot points into an arc of consistent radius to absorb side impacts and then return to their original position, while also enabling the flexible opposed flat sheets to bend freely by rotating at the pivot points of the strut hinges, to absorb vertical impacts by uneven ground surfaces and then return to their original position; so that the predetermined height above the ground surface of the lower edge of the opposing flat sheets can be minimized without resulting in damage to the device due to impacting uneven ground surfaces, so that maximum airflow is directed around the rear wheels reducing the aerodynamic resistance of the vehicle when moving.

* * * * *